US012781717B2

(12) United States Patent
Amaya, Jr.

(10) Patent No.: US 12,781,717 B2
(45) Date of Patent: Nov. 3, 2026

(54) SOLAR UPDRAFT TOWER SYSTEM WITH PARABOLIC TROUGH SOLAR COLLECTION

(71) Applicant: Andres Amaya, Jr., Denver, CO (US)

(72) Inventor: Andres Amaya, Jr., Denver, CO (US)

( * ) Notice: Subject to any disclaimer, the term of this patent is extended or adjusted under 35 U.S.C. 154(b) by 0 days.

(21) Appl. No.: 19/468,194

(22) Filed: Feb. 3, 2026

(65) Prior Publication Data

US 2026/0226886 A1 Aug. 6, 2026

Related U.S. Application Data

(60) Provisional application No. 63/756,395, filed on Feb. 10, 2025, provisional application No. 63/753,384, filed on Feb. 3, 2025.

(51) Int. Cl.
*F03G 6/06* (2006.01)

(52) U.S. Cl.
CPC .................................... *F03G 6/061* (2021.08)

(58) Field of Classification Search
CPC ........................................................ F03G 6/061
(Continued)

(56) References Cited

U.S. PATENT DOCUMENTS 3,936,652 A * 2/1976 Levine .................... F03D 15/10
261/DIG. 11
4,319,141 A * 3/1982 Schmugge .............. F03D 9/007
60/398

(Continued)

FOREIGN PATENT DOCUMENTS

CN 101975145 A * 2/2011
CN 110439768 A * 11/2019 ............. F24S 20/20
(Continued)

OTHER PUBLICATIONS

Amaya, A. "Solar Updraft Tower System With Parabolic Trough Solar Collection." Provisional Patent Application filed Feb. 3, 2025, 34 pages.

(Continued)

*Primary Examiner* — Jesse S Bogue
(74) *Attorney, Agent, or Firm* — Whiteford, Taylor & Preston LLP; Jeffrey Schell

(57) ABSTRACT

A compact thermal booster solar updraft tower system comprising a 1000-meter tall central tower with 100-meter diameter and base arches for air intake. The system transitions from conventional low-intensity greenhouse heating to high-intensity concentrated thermal injection using radially arranged parabolic troughs, each 1-meter wide and 60-meters long, elevated 30 meters above ground level. Square heat-absorbing stainless steel pipes (45 cm cross-section) suspended above each trough achieve internal operating temperatures up to 500° C., providing 27% greater surface area than circular equivalents for enhanced solar absorption. Staged mixing injection releases heated air at 10-20 meters above a turbine system positioned at 5-10 meters, creating temperature differentials of 100° C. and generating updraft velocities up to 50 mph. The 300-meter total diameter represents a 94% footprint reduction compared to conventional 7,000-meter designs while achieving superior power generation through concentrated solar thermal integration.

20 Claims, 5 Drawing Sheets

(58) Field of Classification Search
USPC .......................................................... 60/641.12
See application file for complete search history.

(56) References Cited

U.S. PATENT DOCUMENTS

| | | | | | |
|---|---|---|---|---|---|
| 4,331,042 | A * | 5/1982 | Anderson | F24S 10/00 415/199.5 |
| 5,300,817 | A * | 4/1994 | Baird | F03G 6/045 290/55 |
| 7,234,303 | B2 * | 6/2007 | Thiagarajan | F03D 9/007 60/641.15 |
| 7,296,410 | B2 * | 11/2007 | Litwin | F03G 6/067 60/641.15 |
| 8,572,965 | B2 * | 11/2013 | Otsuka | F03G 6/071 60/659 |
| 8,960,186 | B2 | 2/2015 | Yangpichit | |
| 9,097,241 | B1 | 8/2015 | Hollick et al. | |
| 10,337,504 | B1 * | 7/2019 | Al-Sulaiman | F01D 15/10 |
| 10,608,134 | B2 | 3/2020 | Wheelwright et al. | |
| 2009/0229598 | A1 * | 9/2009 | Cao | F24S 70/16 428/34.4 |
| 2016/0097374 | A1 * | 4/2016 | Hollick | F03D 9/11 60/641.12 |

FOREIGN PATENT DOCUMENTS

| | | | | | |
|---|---|---|---|---|---|
| DE | 102005053857 | B4 * | 11/2008 | F03G 6/061 |
| GB | 189608711 | A | 4/1897 | |
| WO | WO-2011116625 | A1 * | 9/2011 | B32B 18/00 |

OTHER PUBLICATIONS

Pennsylvania State University. "Parabolic Trough Collector Systems." https://courses.ems.psu.edu/eme811/book/export/html/678, obtained on Jun. 3, 2026, 11 pages.

Wikipedia. "Solar Updraft Tower." https://en.wikipedia.org/wiki/Solar_updraft_tower, obtained on Jun. 3, 2026, 15 pages.

Schlaich Bergermann Partner. "Solar Updraft Tower Pilot Plant Manzanares." https://www.sbp.de/en/project/solar-updraft-tower-pilot-plant-manzanares/, SBP 2026, 4 pages.

International Journal of Engineering and Innovative Technology. "Case Study: Solar thermal hybrid chimney." https://web.archive.org/web/20200715075259/https://www.ijeit.com/Vol%209/Issue%205/IJEIT1412201911_08.pdf.

Renewable Energy Magazine. "Why solar chimneys could be the way forward." https:// www.renewableenergymagazine.com/solar_thermal_electric/why-solar-chimneys-could-be-the-way, obtained on Jun. 3, 2026, 5 pages.

Van Blommestein et al., "Life Cycle Assessment of Solar Chimneys", University of Johannesburg, https:// ujcontent.uj.acza/view/pdfCoverPage? instCode=27UOJ_INST&filePid=135875820007691&download=true, 20th CIRP International Conference on Life Cycle Engineering, Singapore, 2013, 9 pages.

Das et al., "A review on recent advances in hybrid solar updraft tower plants: Challenges and future aspects", ResearchGate, https://www.researchgate.net/ publication/367763752_A_review_on_recent_advances_in_hybrid_solar_updraft_tower_plants_Challenges_and_future_aspects, Abstract obtained on Jun. 10, 2026, 11 pages.

Central Arizona Project. "Concentrating Solar Power (CSP) Overview." https://library.cap-az.com/documents/meetings/Oct. 17, 2013/3_Combined_Solar_CSP.pdf , Apr. 2012, 56 pages.

CNN Money. "Tower of Power". https://web.archive.org/web/20060820104316/http://money.cnn.com/magazines/business2/business2_archive/2006/08/01/8382232/index.htm, Jul. 20, 2006, 8 pages.

Marzouk, O. A. "Enclosed Solar Enhanced Oil Recovery (ESEOR)." https://engrxiv.org/preprint/view/6348/ version/8283, 2026, 3 pages.

PerthNow. Dallas Dempster's sky-high comeback. https://en.wikipedia.org/wiki/Solar_updraft_tower, Dec 31, 2011, 7 pages.

Lupi, F. "A New Aerodynamic Phenomenon and Its Effects on the Design of Ultra-High Cylindrical Towers." https://web.archive.org/web/20231119160455/https://leopard.tu-braunschweig.de/servlets/MCRFileNodeServlet/dbbs_derivate_00033674/ LUPI_Dissertation.pdf, 356 pages.

International Association for Wind Engineering. "The Solar Updraft Power Plant: Design and Optimization of the Tower for Wind Effects." https://web.archive.org/ web/20170811015301/http://www.iawe.org/Proceedings/5EACWE/136. pdfJuly 2009, 12 pages.

EOLSS. "Solar Updraft Power Plant Technology: Basic Concepts and Structural Design." http://www.eolss.net/sample-chapters/ c08/e6-106-43-00.pdf, obtained Jun. 2026, 2 pages.

Journal of Solar Engineering. "Evaluation of the Optical and Thermal Performance of a 100 kWe Micro-Solar Tower Power Plant in Sub-Saharan Africa: A Case of Chad." https://doi.org/10.1115/1.4069741, Oct. 2025, 11 pages.

ResearchGate. "Concentrating Solar Power and It's Prospect in Bangladesh." https://www.researchgate.net/publication/224133530_Concentrating_Solar Power_CSP_and_its_prospect_in_Bangladesh, Jan. 2010, 7 pages.

Upadhyay, B. H. "Parabolic Trough Collector, a Novel Design for Domestic Water Heating Application." https://doi.org/10.22214/ijraset.2017.10073, Oct. 2017, 9 pages.

Oxford Academic "Solar Chimney with Integrated Waste Heat Source On the Ground." https://academicoup.com/ijlct/article-pdf/doi/10.1093/ijlct/ctaf077/63714185/ctaf077.pdf, 2025, 11 pages.

Solar Energy. "Advances in Solar Thermal Electricity Technology". https://doi.org/10.1016/S0038-092X(03)00102-6, Mar. 2004, 9 pages.

Solar Chimneys Part I: Principle and Construction of the Pilot Plant in Manzanares. https://doi.org/10.1080/01425918308909911, 1984, 4 pages.

MDPI. Marzouk "Energy Generation Intensity (EGI) of Solar Updraft Tower(SUT) Power Plants Relative to CSP Plants and PV Power Plants Using the New Energy Simulator "Alldin", Solar Updraft Tower Power Plant Locations." https://www.mdpi.com/1996-1073/17/2/405, 2024, 26 pages.

EnviroMission Large Scale. https://library.cap-az.com/documents/meetings/Oct. 17, 2013/3_Combined_Solar_CSP.pdf, Sep. 2013, 56 pages.

Nasir, A. "Design, Construction and Experimental Study of the Thermal Performance of a Parabolic Cylindrical Trough Solar Air Heater." https://www.researchgate.net/ publication/242237832_Design_Construction_and Experimental_Study_of_the_Thermal_Performance_of_a_Parabolic_Cylindrical_Troug h_Solar_Air_Heater, Jul. 2004, 6 pages.

IJSRET. "Concentrated Solar Power." https://ijsret.com/wp-content/uploads/2021/07/IJSRET_V7_issue4_512.pdf, 2021, 6 pages.

Preprints. "SHIP Category and Thermodynamic Cycles." https://www.preprints.org/manuscript/202509.2252/v1, Sep. 2025, 62 pages.

CSP Technology Layouts. https://silvanovergura.it/wp-content/uploads/2024/04/CSP-S_Vergura.pdf, 2012, 5 pages.

Scribd. "Hybrid Transpired Solar Collector Performance." https://www.scribd.com/document/489650890/Hybrid-transpired-solar-collector-updraft_tower, 2018, 11 pages.

IAWE. "Wind Loading for the Design of the Solar Tower." https://www.iawe.org/Proceedings/5EACWE/136.pdf , 6 pages.

MDPI. "Wind Turbine Safety and Operating Ranges." https://www.mdpi.com/1996-1073/Aug. 18, 2016, Sep. 2025, 22 pages.

Solar Boiler Technology. https://en.wikipedia.org/wiki/Solar_updraft_tower, obtained Jun. 3, 2026, 15 pages.

Abengoa Solana Costs. https://library.cap-az.com/documents/meetings/10-17- 2013/3_Combined_Solar_CSP.pdf, Sep. 2013, 56 pages.

Journal of Solar Energy Research. "Non-Concentrating Solar Thermal Structures." https://jser.ut.acir/article_103000_1e958d2e612e09868c553df1f618cf09.pdf, Winter 2025, 19 pages.

* cited by examiner

SOLAR UPDRAFT TOWER SYSTEM WITH PARABOLIC TROUGH SOLAR COLLECTION

CROSS REFERENCE TO RELATED APPLICATIONS

This application claims the benefit under 35 U.S.C. § 119 (e) of U.S. Provisional Patent Application No. 63/753,384, filed Feb. 3, 2025, and U.S. Provisional Patent Application No. 63/756,395, filed Feb. 10, 2025, each of which is incorporated herein by reference in its entirety.

BACKGROUND OF THE INVENTION

Solar updraft towers represent a potential solution for renewable energy generation, but current implementations face significant challenges. Existing solar updraft tower designs require massive glass canopy structures, typically spanning approximately 7,000 meters in diameter, to generate sufficient heat for power generation.

This extensive glass infrastructure results in enormous construction costs that significantly impact the economic viability of such power generation facilities. The scale of traditional solar updraft tower installations presents substantial practical and economic barriers. For example, the solar updraft tower in Manzanares, Spain, while demonstrating the concept's potential, cost many millions of dollars to construct yet only generated a modest 40 kW of power.

This limited power output relative to the substantial investment highlights a critical inefficiency in current designs. A fundamental problem with existing solar updraft tower technology is its low power generation efficiency. Current systems achieve only approximately 0.5% efficiency in converting solar energy into usable power. This low efficiency, combined with the requirement for extensive glass infrastructure, creates significant challenges for widespread adoption and commercial viability.

The primary technical limitation of current designs centers on their heat generation capabilities. Traditional systems rely on large glass canopies to create temperature differentials of only about 25 degrees Celsius between ambient air and the air pumped into the tower. This relatively small temperature differential necessitates the massive scale of current installations to achieve meaningful power generation.

These challenges create a pressing need for more efficient and cost-effective solutions that can reduce the physical footprint while maintaining or improving power generation capabilities. The industry requires innovative approaches that can overcome these limitations while making solar updraft technology more practical and economically viable for large-scale power generation.

SUMMARY OF THE INVENTION

In the preferred embodiment, the invention provides a compact thermal booster solar updraft tower system that fundamentally departs from conventional large-scale greenhouse collector designs. The system achieves a paradigm shift from low-intensity area heating (1× solar concentration) to high-intensity concentration heating (30×-80× concentration), enabling a 94% reduction in installation footprint while quadrupling the temperature differential compared to traditional designs. The system centers around a 1000-meter tall tower with a 100-meter diameter, surrounded by an array of 1-900 parabolic troughs arranged radially within a 300-meter total combined diameter, replacing the 7,000-meter diameter glass canopy infrastructure required by conventional solar updraft tower technology.

A core advancement lies in replacing traditional large-scale glass canopies with precisely engineered parabolic troughs. Each trough measures 1 meter in width by 60 meters in length and incorporates a reflective stainless steel surface that concentrates solar energy onto suspended square pipes. This configuration enables the system to achieve air temperatures of up to 500 degrees within the delivery pipes, creating temperature differentials of approximately 100 degrees Celsius—far exceeding the 25-degree differential typical of conventional designs.

The system's efficiency is demonstrated through its significantly reduced footprint, requiring only a 300-meter diameter installation compared to the 7,000-meter diameter needed for traditional glass canopy systems. Despite this dramatic reduction in size, the system achieves superior heating efficiency through its concentrated solar collection method, with each pipe capable of collecting approximately 40,000 watts of solar energy.

The invention solves critical problems in existing solar updraft tower technology by substantially reducing construction costs while improving power generation efficiency. The elimination of extensive glass canopy structures, combined with the enhanced heating capability of the parabolic trough system, enables more cost-effective electricity production while maintaining the ability to generate updraft velocities of up to 50 miles per hour within the tower structure.

Through this innovative design, the invention provides a practical and efficient solution for solar thermal power generation, addressing both the capacity limitations and cost constraints that have historically challenged solar updraft tower technology. The turbine system may be configured with enhanced blade designs including multiple turbine blades operating in opposing or same directions, toroidal loop-shaped blades to minimize turbulence, and surface-textured blades with dimples or ridges for improved aerodynamic performance, further optimizing power generation efficiency under the high-velocity updraft conditions created by the system.

DETAILED DESCRIPTION

The present invention comprises an improved solar updraft tower system for generating electrical power. In exemplary embodiments, the system comprises a central solar updraft tower 110 having a height of 1000 meters and a diameter of 100 meters. The tower 110 comprises open arches at its base positioned approximately 5-10 meters above ground level to facilitate air intake.

Figure 1:
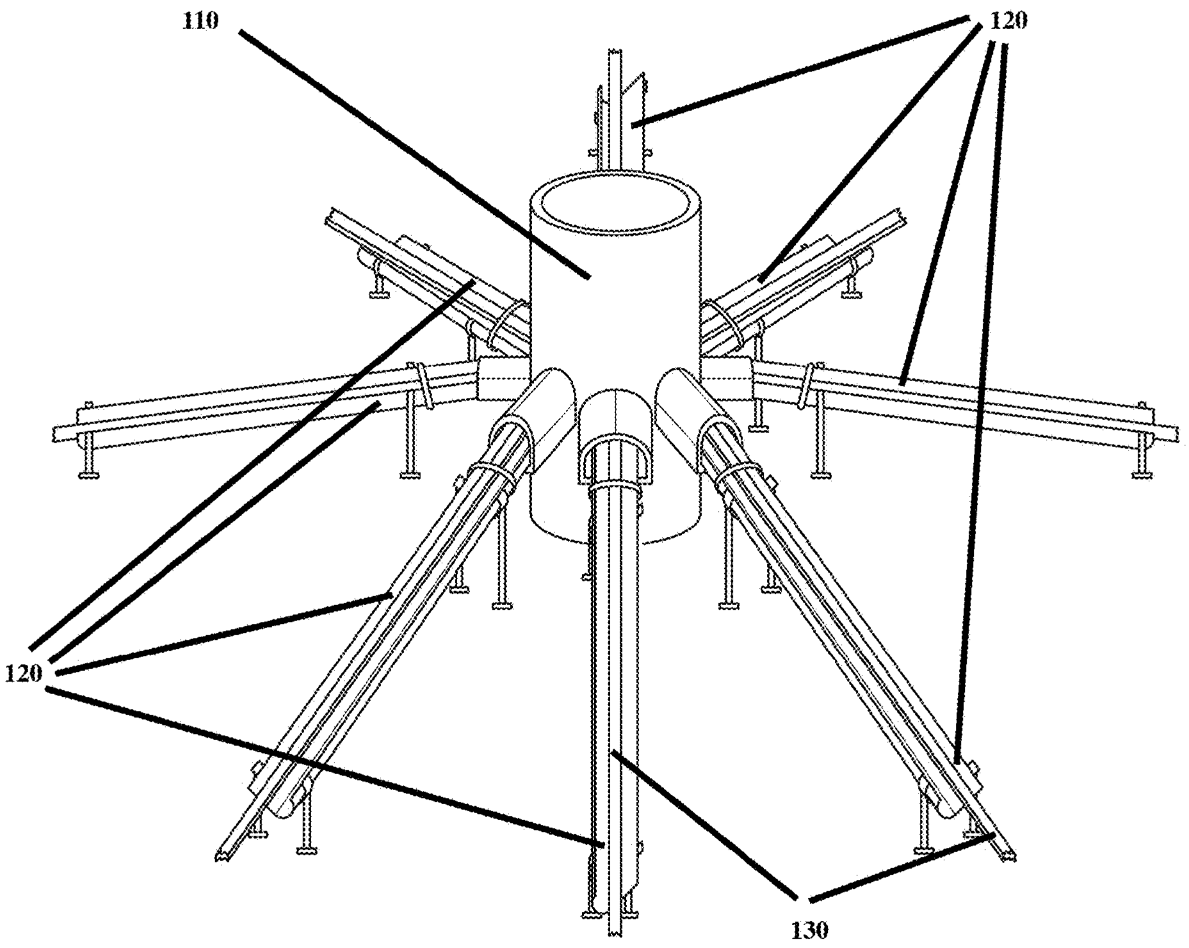
FIG. 1 shows a side view of the solar updraft tower system, illustrating the central tower with surrounding parabolic troughs and pipes arranged around its base in an embodiment.

FIG. 1 illustrates a perspective view of the solar updraft tower system in an embodiment, showing the central tower 110 having a height of approximately 1000 meters and diameter of 100 meters. The figure depicts multiple parabolic troughs 120 arranged radially around the base of the tower, with delivery pipes 130 suspended above each trough. The base includes open arches (AL) positioned approximately 5-10 meters above ground level to facilitate air intake.

Figure 2A:
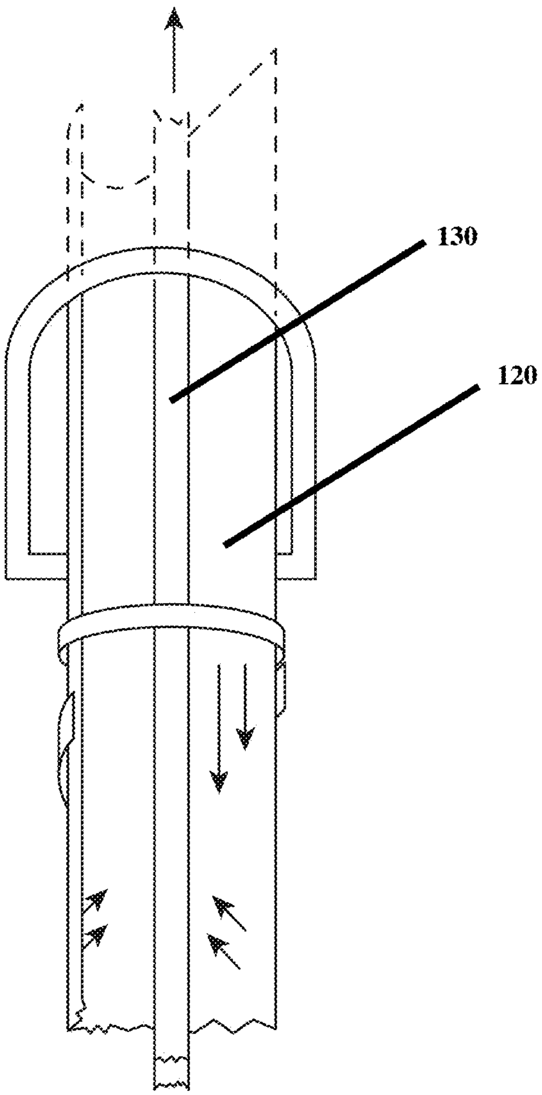
FIG. 2*a* and FIG. 2*b* depict detailed views of the pipe positioned above a parabolic trough, demonstrating the configuration for solar energy collection in an embodiment.
Figure 2B:
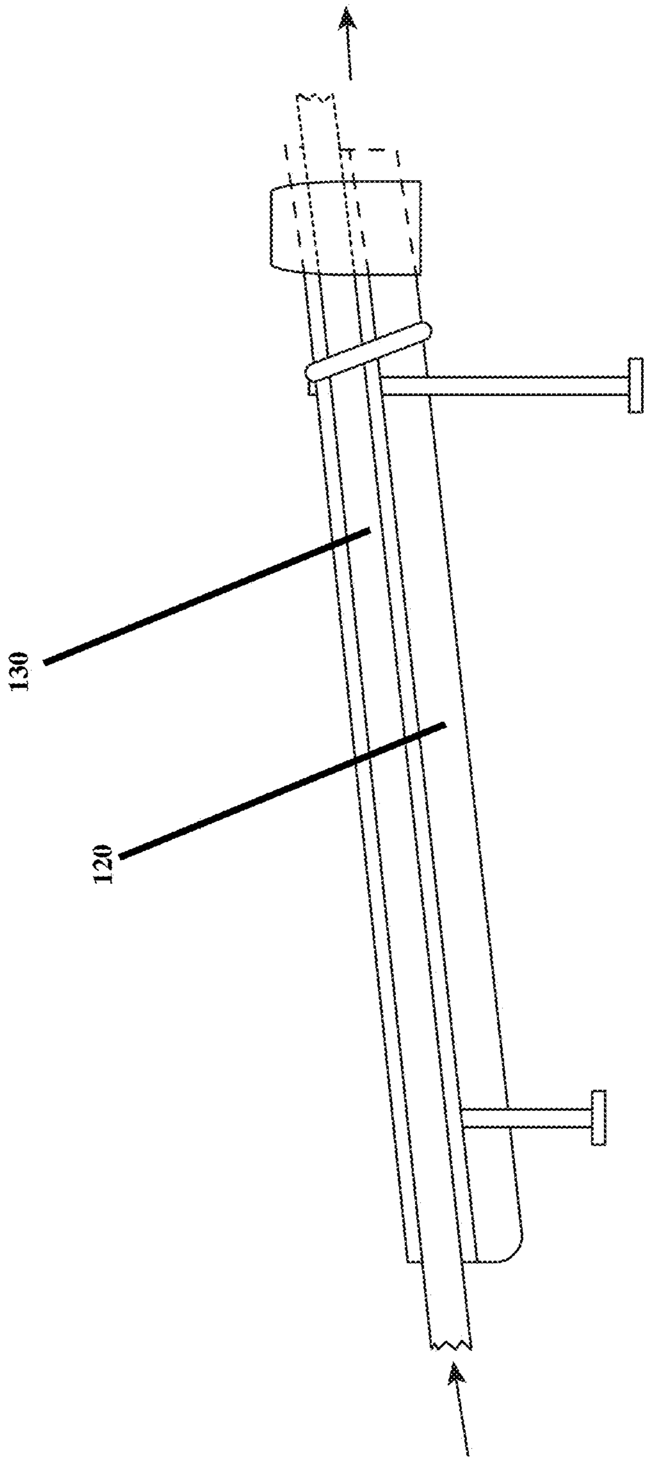

FIG. 2*a* and FIG. 2*b* provide views of the delivery pipe 130 positioned above a parabolic trough 120. In an embodiment, each parabolic trough 120 measures 1 meter in width and extends 60 meters in length, positioned approximately 30 meters above ground level. In an embodiment, the pipe 130 comprises a square cross-section measuring 45 centimeters on each side and is constructed of steel with a flat black finish in the preferred embodiment, in an example configured to maximize the absorption of heat from the light reflected from the stainless steel surface of the parabolic trough 120.

Figure 3:
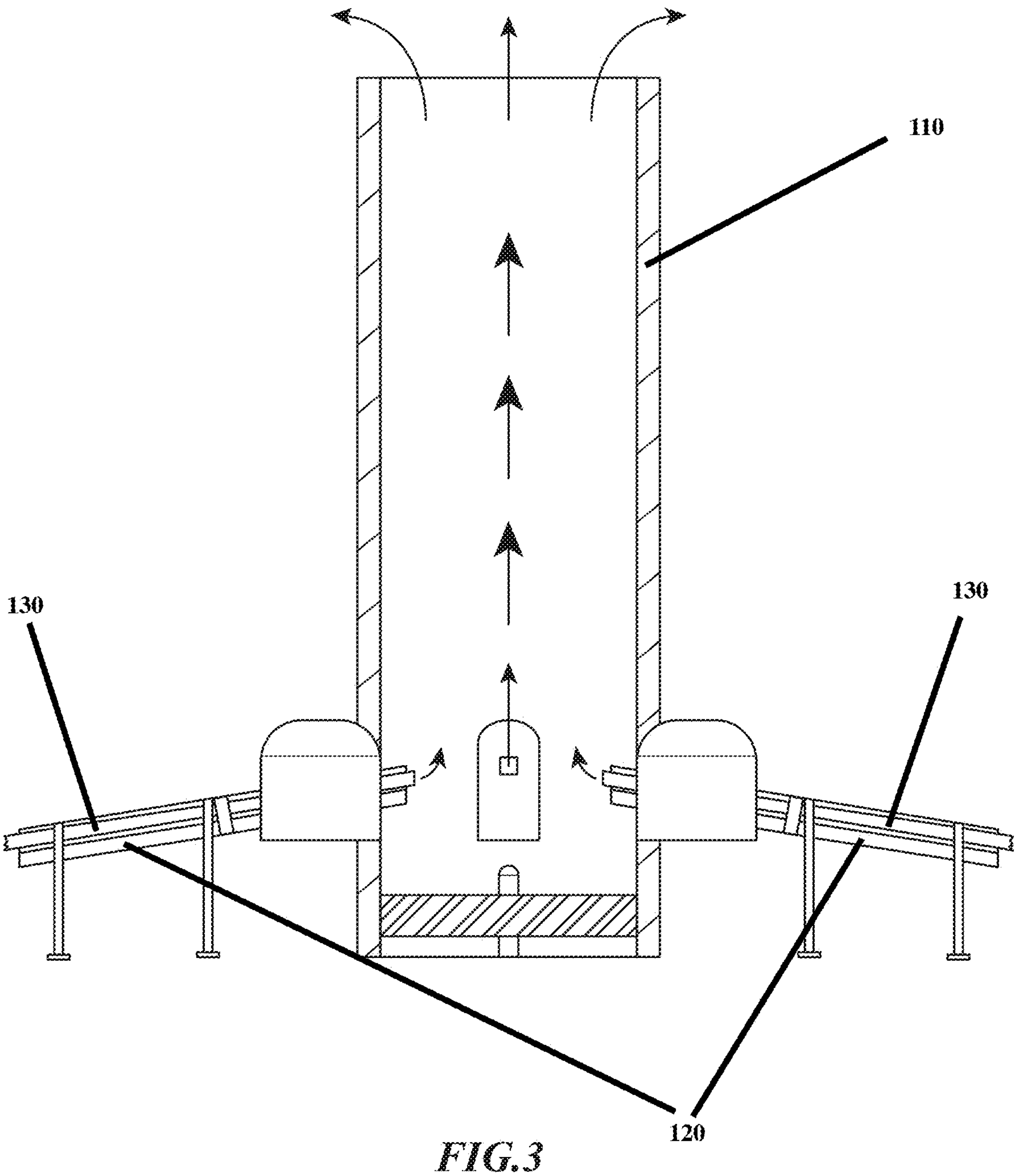
FIG. 3 illustrates the arrangement of the central tower with multiple delivery pipes and parabolic troughs, showing their integration into the overall system in accordance with an embodiment.

FIG. 3 shows the arrangement of the central tower 110 integrated with multiple delivery pipes 130 and parabolic troughs 120 in accordance with an embodiment. This figure illustrates how the parabolic troughs are positioned at approximately 45 degrees to optimize their orientation perpendicular to incoming solar radiation. The figure demonstrates the radial arrangement of the troughs around the tower base within the total combined diameter of 300 meters.

Figure 4:
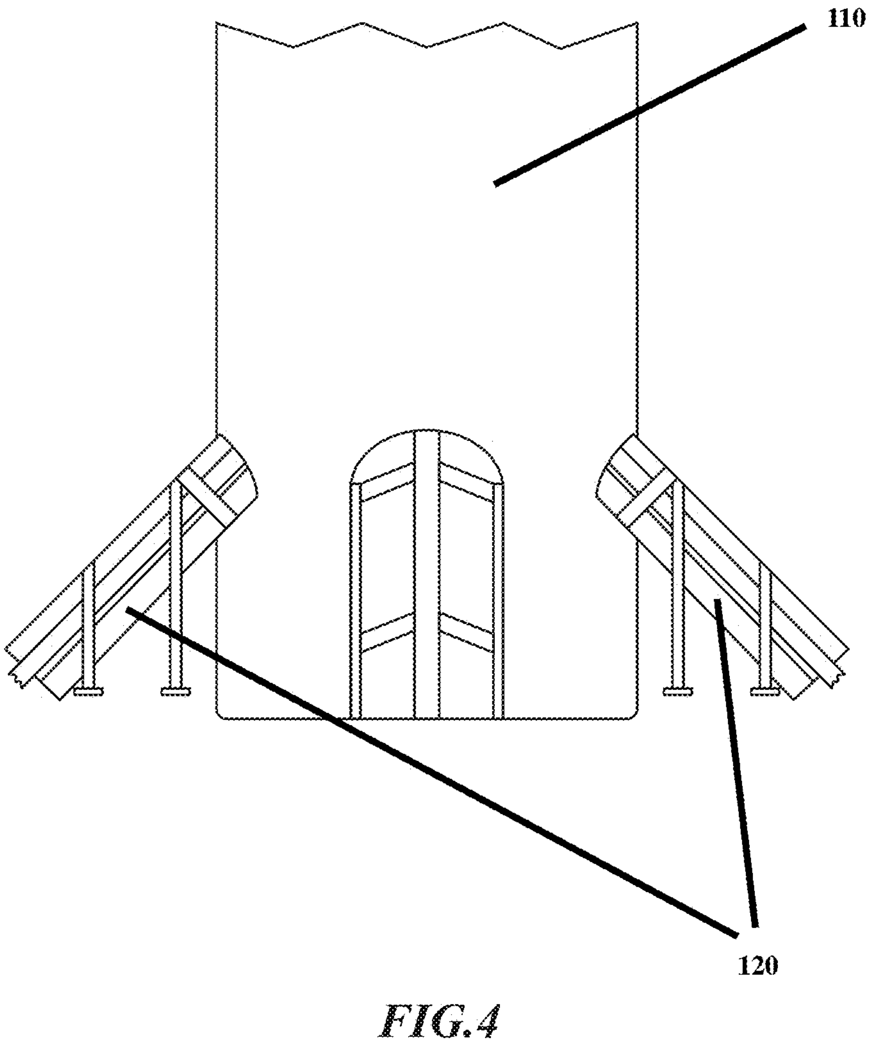
FIG. 4 presents a view of the tower with an associated parabolic trough, depicting their relative positioning and structural relationship in accordance with an embodiment.

FIG. 4 presents a view showing the structural relationship between the tower 110 and an associated parabolic trough 120. This figure illustrates how the system's components are integrated to enable the collection of approximately 40,000 watts of solar energy per delivery pipe while maintaining the significantly reduced footprint compared to conventional 7,000-meter diameter installations.

In an embodiment of the invention, surrounding the base of the tower 110 in a radial arrangement are between 1 to 900 parabolic troughs 120 that serve as the primary solar collection mechanism. Each individual trough measures 1 meter in width and extends 60 meters in length. The troughs 120 are elevated approximately 30 meters above ground level and are positioned at roughly 45 degrees to optimize their orientation perpendicular to incoming solar radiation.

A key component of the system in accordance with an embodiment of the invention is a square pipe 130 suspended above each parabolic trough 120. These square pipes 130, in an embodiment measure 45 centimeters on each side. In an embodiment, the pipes 130 are constructed of a durable material suitable for a pipe such as steel, in an exemplary embodiment the durable material comprising a non-reflective dark or matte black finish to maximize the absorption of heat energy.

The pipes 130 are strategically positioned to receive focused sunlight from the troughs 120 below, facilitating efficient heat transfer to the air contained within. The entire structure, including the central tower 110 and surrounding trough 120 array, in the preferred embodiment spans a total combined diameter of 300 meters.

This configuration enables the system to achieve substantially higher temperature differentials compared to conventional designs. While traditional systems typically generate temperature differentials of approximately 25 degrees Celsius between ambient air and tower air, the preferred embodiment's unique arrangement can create temperature differentials of up to 100 degrees Celsius.

In an embodiment of the invention, the solar updraft tower comprises a central vertical structure having a height of 1000 meters and a diameter of 100 meters. The tower is configured with open arches at its base, positioned approximately 5-10 meters above ground level to facilitate air intake.

In the preferred embodiment, the tower functions as a giant chimney structure designed to create an updraft effect for power generation. The tower's substantial height and diameter are specifically engineered to generate sufficient updraft velocities, with the system capable of creating wind speeds of up to 50 miles per hour within the tower structure.

The structural design of the present invention addresses a multi-physics engineering challenge not contemplated by conventional solar updraft tower designs or standard concentrating solar power systems. The integration of 500° C. concentrated heat injection into a 1000-meter atmospheric convection chimney creates compound thermal and aerodynamic loads: the 1.42-meter vertical expansion of the concrete shell under 100° C. internal temperature differentials, combined with internal wind forces of 50 mph and external environmental wind loading. The engineered solution—incorporating a thickness gradient from 2.0 meters at the base to 0.5 meters at the apex, expansion joints every 50 meters vertically, and reinforced concrete designed for high-temperature resistance—represents a structural synergy between reinforced concrete civil engineering principles and high-temperature solar concentration engineering that would not be apparent from examining either technology domain in isolation.

In an embodiment of the invention, the tower's height of 1000 meters creates a natural chimney effect through the temperature differential between the base and top of the structure. The tower's diameter of 100 meters provides sufficient cross-sectional area to accommodate the upward airflow while maintaining optimal flow velocities.

In the preferred embodiment, the tower's dimensions are specifically calculated to work in conjunction with the heated air delivery system. The heated air, which reaches temperatures of up to 500 degrees within the delivery pipes, is released into the tower interior at a height of 10-20 meters above the base, positioned above the turbine system. This creates a temperature differential of approximately 100 degrees Celsius between the ambient air entering through the base arches and the heated air released within the tower, significantly greater than the 25 degree differential achieved in conventional designs.

In an embodiment of the invention, the combination of the tower's substantial height and the enhanced temperature differential generates strong convection currents. The ambient air enters through the arches at the tower's base, located 5-10 meters above ground level, where it mixes with the heated air from the solar collection system. This heated air mass rises through the tower's full 1000-meter height, creating the powerful updraft effect that drives the turbine system.

In an embodiment of the invention, the tower structure is constructed using reinforced concrete with a cylindrical shell design. The tower walls incorporate post-tensioned concrete with a thickness gradient ranging from 2 meters at the base to 0.5 meters at the top, providing optimal structural integrity while minimizing material costs. The concrete mixture is specifically engineered for high-temperature resistance up to 500 degrees Celsius and incorporates thermal expansion joints every 50 meters vertically.

In the preferred embodiment, the tower's foundation system comprises a reinforced concrete mat foundation extending to a diameter of 150 meters, with additional deep pile foundations to ensure stability. The foundation system is designed to accommodate both the static loads of the 1000-meter structure and the dynamic loads created by the 50 mph updraft velocities.

In an embodiment of the invention, the elevated parabolic troughs are supported by a system of steel framework structures positioned approximately 30 meters above ground level. Each support structure in an exemplary embodiment comprises: primary vertical columns spaced at 10-meter intervals, horizontal cross-bracing every 5 meters vertically, diagonal wind bracing members, and thermal expansion joints every 20 meters horizontally.

The support structure for each 60-meter trough section is engineered in an exemplary embodiment to accommodate the following calculated loads:

Wind Load Calculation:

$P=0.5\times\rho\times v^2\times Cd\times A$ where: ρ=air density (1.225 kg/m$^3$)$v$=design wind speed (40 m/s)$Cd$=drag coefficient (2.0 for parabolic shape)$A$=projected area of trough (60 m$^2$) Resulting in a design wind load of approximately 120 kN per trough section.

In the preferred embodiment, thermal expansion calculations for the tower structure account for the temperature differential between ambient conditions and the 500-degree operating temperature:

$$\text{Thermal Expansion} = \alpha \times L \times \Delta T$$

where:

- α=coefficient of thermal expansion (14.2× $10^{-6}$/° C. for reinforced concrete)
- L=height of tower (1000 m)
- ΔT=temperature differential (100° C.)
- This results in a calculated vertical expansion of approximately 1.42 meters at maximum operating temperature, accommodated through engineered expansion joints.

In an embodiment of the invention, the base arches are constructed using reinforced concrete with steel arch supports. The arch openings, positioned 5-10 meters above ground level, are engineered to withstand both the structural loads of the tower above and the aerodynamic forces created by the intake airflow. Each arch incorporates wind deflectors and structural reinforcement to maintain stability under the 50 mph updraft conditions.

In an embodiment of the invention, the base of the tower incorporates a series of open arches that encircle the tower's circumference. These arches are strategically positioned to allow ambient air to be drawn into the tower. The open architecture at the base creates an intake zone where ambient air can freely flow into the tower structure, facilitating the convection process that drives the system's operation.

In an embodiment of the invention, the convection process begins as ambient air enters through the base arches and encounters heated air from the solar collection system. The heated air, which can reach temperatures of up to 500 degrees, is introduced into the tower interior at a height of 10-20 meters above the base, positioned strategically above the turbine system.

In the preferred embodiment, the significant temperature differential between the ambient air and the heated air drives the convection process. While conventional systems typically achieve temperature differentials of only 25 degrees Celsius, the present embodiment creates a differential of approximately 100 degrees Celsius between the ambient air entering at the base and the heated air released within the tower.

In an embodiment of the invention, the heated air mass naturally rises through the tower structure due to its lower density compared to the cooler ambient air. This rising action creates a continuous updraft effect, pulling additional ambient air through the base arches to replace the rising heated air. The system is designed to generate wind speeds of up to 50 miles per hour within the tower structure through this natural convection process.

In the preferred embodiment, the convection process is enhanced by the tower's substantial height of approximately 1000 meters, which maintains the temperature differential and ensures consistent airflow. The heated air from the solar collection system is delivered through square pipes that transfer the collected heat from outside the tower to its interior. These pipes, suspended above the parabolic troughs, efficiently transfer the solar-generated heat to the air within the tower, maintaining the convection cycle.

In the preferred embodiment, the tower's internal structure is designed to accommodate a turbine system positioned near the base of the tower, approximately 5-10 meters above ground. This positioning allows the turbine to capture the energy from both the ambient air being drawn in through the base arches and the heated air being introduced from the solar collection system.

In an embodiment of the invention, the turbine system comprises a vertical-axis wind turbine specifically designed to operate with the high-velocity updraft conditions created within the tower. The turbine is configured to efficiently capture both the ambient airflow entering through the base arches at 5-10 meters above ground level and the heated airflow released from the delivery pipes at 10-20 meters above the base.

In the preferred embodiment, the turbine system is engineered to operate continuously with wind speeds of 50 miles per hour or more generated by the natural convection process within the tower structure. The turbine's blade configuration and operational parameters are optimized for the unique airflow conditions created by the 100-degree Celsius temperature differential between the ambient air and the heated air mass.

In an embodiment of the invention, the turbine system may incorporate multiple blade sets arranged vertically to maximize energy capture from the combined ambient and heated airflows. The blade design features curved surfaces engineered to efficiently harness both the horizontal flow of ambient air being drawn through the base arches and the vertical updraft created by the rising heated air mass. The turbine system may comprise a single blade configuration or two or more turbine blades operating within the interior space of the tower. When multiple blades are employed, they may be configured to rotate in opposing directions to maximize energy extraction and balance structural loads, or in the same direction for operational simplicity. The blade configurations may include conventional straight blade designs, toroidal loop-shaped blades to reduce turbulence, or blades with dimpled or ridged surface features to enhance aerodynamic efficiency.

In the preferred embodiment, the turbine system's power output capacity is matched to the thermal energy input provided by the solar collection system. With each delivery pipe capable of collecting approximately 40,000 watts of solar energy, the turbine system is configured to efficiently convert the resulting updraft energy into mechanical power.

The turbine's position at the base of the tower, approximately 5-10 meters above ground level, enables it to capture the maximum available energy from the mixing of ambient and heated air streams.

In an embodiment of the invention, the turbine system's operational parameters are optimized for the continuous airflow generated by the tower's natural convection process. The turbine's rotational speed and blade pitch are specifically engineered to maintain efficient power generation across varying wind speeds of over 50 miles per hour, ensuring consistent operation throughout periods of solar heating availability.

In an alternative embodiment of the invention, the turbine system comprises two or more turbine blades configured to operate within the interior space of the central tower. This multi-blade configuration enables enhanced energy capture from the updraft generated by the convection process. The multiple turbine blades may be arranged vertically along the tower's interior or positioned at the same elevation, depending on the specific operational requirements and tower geometry.

In the preferred embodiment of the multi-blade configuration, the two or more turbine blades may be configured to rotate in opposing directions, creating a counter-rotating system that maximizes energy extraction from the updraft while balancing rotational forces within the tower structure. Alternatively, the turbine blades may be configured to rotate in the same direction, providing operational consistency and simplified mechanical integration with the power generation system. The directional configuration is selected based on optimization of power output, structural loading considerations, and maintenance requirements.

In an embodiment of the invention, the turbine system may incorporate toroidal blade designs, wherein each turbine blade is configured in a loop shape rather than traditional straight blade configurations. The toroidal blade design significantly reduces turbulence at the blade tips, a common source of energy loss and noise in conventional turbine systems. While toroidal blade technology is currently utilized in drone propulsion systems, the present invention scales this design to turbine size to maximize power generation capacity. The toroidal configuration may be implemented as a single toroidal blade or multiple toroidal blades operating within the tower interior, depending on the desired power output and operational parameters. The loop-shaped configuration of toroidal blades creates a continuous airflow path that minimizes vortex formation and enhances overall turbine efficiency under the high-velocity updraft conditions generated within the tower.

In an embodiment of the invention, the turbine blades incorporate surface features comprising dimples or ridges configured to enhance aerodynamic performance. Similar to the dimpled surface texture of golf balls, which reduces drag and increases travel distance, the textured blade surfaces improve airflow characteristics across the blade during rotation. The dimpled or ridged surface features create micro-turbulence in the boundary layer adjacent to the blade surface, reducing overall drag and increasing lift efficiency. This surface treatment is applicable to conventional blade designs, multi-blade configurations, and toroidal blade systems, providing enhanced performance across all turbine embodiments. The specific pattern, depth, and spacing of the dimples or ridges are optimized based on the operational wind speeds of up to 50 miles per hour generated within the tower structure and the specific blade geometry employed.

The tower's substantial height of 1000 meters creates a significant chimney effect, enabling the system to maintain consistent airflow through natural convection. As heated air is introduced into the tower, it rises through the structure's full height, creating a continuous updraft that drives the power generation system.

In an embodiment of the invention, the power generation system comprises electrical generators mechanically coupled to the turbine system positioned near the base of the tower. The generators are engineered to operate efficiently with the varying rotational speeds produced by updraft velocities of more than 50 miles per hour within the tower structure.

In the preferred embodiment, the generator system is designed to accommodate the power input from the turbine system, which is driven by the natural convection process created by the 100-degree Celsius temperature differential. The generators are configured to efficiently convert the mechanical energy from the turbine system that captures both the ambient airflow through the base arches and the heated airflow released 10-20 meters above.

In an embodiment of the invention, the power conditioning system incorporates voltage regulators and frequency converters to stabilize the electrical output from the generators. This system manages the varying power generation levels that result from fluctuations in solar heating and updraft velocities throughout the day. The power conditioning equipment is designed to maintain stable electrical output despite variations in turbine speeds as the system responds to changing temperature differentials between ambient air and the heated air mass that can reach up to 500 degrees within the delivery pipes.

In the preferred embodiment, the grid integration system includes power quality management equipment to ensure the generated electricity meets utility interconnection requirements. The system incorporates synchronization controls to match grid frequency and phase angles, along with protective relaying to safeguard both the generation equipment and the connected grid infrastructure. The integration system is designed to efficiently manage the power output from the solar updraft tower's generation capacity, with each delivery pipe contributing approximately 40,000 watts of collected solar energy to drive the overall system.

In an embodiment of the invention, the turbine system is positioned to optimally capture both the ambient airflow entering through the base arches and the heated airflow from the solar collection system. The turbine is strategically located at the base of the tower, approximately 5-10 meters above ground level, where it can harness the maximum airflow generated by the 100-degree Celsius temperature differential between the ambient and heated air.

In the preferred embodiment, the turbine system is designed to operate efficiently with wind speeds of 50 miles per hour or more generated within the tower structure. The turbine is positioned below the point where the heated air is released into the tower interior, which occurs at approximately 10-20 meters above the base, allowing the turbine to capture the full energy potential of the rising heated air mass.

In an embodiment of the invention, the turbine system is configured to harness the energy from the continuous updraft created by the combination of ambient air being pulled through the base arches and the heated air being introduced from the solar collection pipes. The turbine's location at the base of the tower enables it to capture the energy from the initial mixing of the ambient and heated air streams, where the velocity potential is highest due to the maximum temperature differential.

In the preferred embodiment, the turbine system operates continuously as the solar-heated air, which can reach temperatures of up to 500 degrees within the delivery pipes, is released into the tower interior. This creates a sustained power generation cycle that maintains consistent operation as long as solar heating is available to drive the convection process.

In an embodiment of the invention, the delivery pipes comprise square tubes measuring 45 centimeters on each side, comprising non-reflective material such as matte black steel with a flat or dull finish.

The square shape of the pipes provides increased surface area for heat absorption compared to conventional circular designs.

In the preferred embodiment, each delivery pipe is suspended above a parabolic trough and receives concentrated solar energy on its inferior surface. The pipes contain air that is heated by the focused sunlight from the troughs below, enabling the internal air temperature to reach up to 500 degrees.

In an embodiment of the invention, the delivery pipes transfer the heated air from their external position above the troughs to release points within the tower interior. The pipes are positioned approximately 30 meters high externally, and release their heated air at points approximately 10-20 meters above the turbine level inside the tower. In the preferred embodiment, each delivery pipe is observed by the present invention as capable of collecting and transferring approximately 40,000 watts of solar energy. The pipes connect from the exterior solar collection area to the tower interior, creating a continuous flow of heated air that maintains the convection process.

In an embodiment of the invention, the exterior solar collection area comprises a radial arrangement of 1-900 parabolic troughs surrounding the base of the tower. The collection area spans a total combined diameter of approximately 300 meters, with each trough measuring 1 meter in width and extending 60 meters in length.

The delivery pipes, in an embodiment measuring 45 centimeters on each side, are constructed of nonreflective steel comprising a flat black finish specifically designed to efficiently capture the concentrated solar energy from the troughs below. In an embodiment of the invention, the parabolic shape of each trough concentrates solar energy onto the inferior surface of the suspended square pipe. The pipe's stainless steel construction with a dark nonreflective finish in an exemplary embodiment enhances heat absorption and transfer to the air contained within.

This concentrated solar heating enables the air within the pipes to reach temperatures of up to 500 degrees, significantly higher than conventional solar updraft tower designs. In the preferred embodiment, the heated air from the pipes is transferred into the tower interior through a system of air passages. The delivery pipes connect from the exterior solar collection area to release points within the tower, positioned 10-20 meters above the turbine level. This arrangement allows the superheated air to mix with the ambient air being drawn in through the base arches, creating the substantial temperature differential that drives the convection process.

In an embodiment of the invention, each delivery pipe is capable of collecting approximately 40,000 watts of solar energy. The square shape of the pipes provides increased surface area for heat absorption compared to conventional circular designs, enhancing the overall efficiency of the solar heating process.

In an embodiment of the invention, the delivery pipes are constructed of Type 316L stainless steel with a matte black non-reflective surface finish to maximize both heat absorption and heat transfer efficiency. The pipes' square cross-section, measuring 45 centimeters on each side, provides an optimal surface area for heat collection while maintaining structural integrity at operating temperatures up to 500 degrees.

In the preferred embodiment, the heat transfer process within the delivery pipe system can be characterized by the following thermal properties and calculations:

Heat Transfer Coefficient Calculation:

$$h = (Q)/(A \times \Delta T)$$

where:

h=heat transfer coefficient

Q=heat transfer rate (40,000 watts per pipe)

A=total surface area of pipe exposed to concentrated solar radiation

ΔT=temperature difference between pipe surface and internal air

For the 45 cm square pipe with 60 m length:

$$\text{Surface Area } (A) = 4 \times 0.45 \text{ m} \times 60 \text{ m} = 108 \text{ m}^2$$

$$\text{Temperature Differential } (\Delta T) = 500^\circ \text{ C.} - 25^\circ \text{ C.} = 475^\circ \text{ C.}$$

Therefore:

$$h = 40{,}000 \text{ W}/\left(108 \text{ m}^2 \times 475^\circ \text{ C.}\right) = 0.78 \text{ W/m}^{2 \cdot \circ} \text{ C.}$$

In an embodiment of the invention, the steel pipes incorporate a dark non-reflective finish configured to maximize the absorption of heat. This surface finish, optionally with surface treatments designed to further maximize the collection of heat energy from the sunlight redirected from the reflective parabolic troughs, provides the optimal combination of solar energy absorption on the surface.

In the preferred embodiment, the thermal conductivity of the Type 316L stainless steel pipe material is approximately 16.3 W/m·K at 500° C. operating temperature. The pipes maintain structural integrity and optimal heat transfer properties across the full operating temperature range from ambient to 500 degrees through engineered expansion joints and thermal isolation systems.

The square cross-section design provides approximately 27% more surface area compared to a circular pipe of equivalent internal volume, enabling enhanced heat absorption from the concentrated solar radiation reflected by the parabolic troughs. This 27% surface area advantage is critical to achieving the 40,000-watt collection capacity per pipe specified in the design. In a concentrating system utilizing parabolic troughs, this expanded surface area functions as a wider target for the focal line of the parabola, reducing optical spillage losses that would otherwise prevent the system from reaching the 500° C. operating threshold. This geometric optimization enables the transition from conventional low-intensity solar updraft tower designs (achieving 25° C. differentials) to the high-exergy concentration regime (achieving 100° C. differentials) that defines the present invention's performance advantage. The increased surface area, combined with the specified material properties and heat absorption maximizing surface finish, enables each pipe to achieve the 40,000 watt collection capacity while maintaining structural integrity at elevated operating temperatures.

In the preferred embodiment, the parabolic troughs within the exterior collection area are elevated approximately 30 meters above ground level and positioned at roughly 45 degrees to optimize their orientation perpendicular to incoming solar radiation. Each trough in the collection area incorporates a reflective surface, optionally a polished stainless steel, designed to focus incoming sunlight onto the suspended square delivery pipes.

In an embodiment of the invention, the exterior collection area includes the suspended square pipes positioned above each parabolic trough. These pipes, measuring 45 centimeters on each side, are constructed of heat absorbing finish stainless steel to maximize solar energy absorption from the sunlight reflected from the parabolic cross-section troughs. The pipes are strategically suspended above the troughs to receive the concentrated solar energy reflected from below.

In the preferred embodiment, the exterior solar collection area is configured to heat the air within the delivery pipes to temperatures of up to 500 degrees through the concentrated solar energy from the parabolic troughs. This arrangement in an exemplary deployment enables each pipe within the collection area to collect approximately 40,000 watts of solar energy, which is then transferred to the tower interior through the delivery pipe system.

In an embodiment of the invention, the delivery pipes are arranged to direct the heated air above the turbine system, which is positioned at the base of the tower approximately 5-10 meters above ground level. This configuration allows the heated air to mix with ambient air being drawn in through the base arches, creating a temperature differential of approximately 100 degrees Celsius between the ambient air and the heated air from the pipes.

In an embodiment of the invention, the solar heating process begins with an array of 1-900 parabolic troughs arranged radially around the base of the tower. Each trough measures 1 meter in width and 60 meters in length, positioned approximately 30 meters above ground level. In the preferred embodiment, each parabolic trough is oriented at approximately 45 degrees to be perpendicular to incoming solar radiation. The troughs are constructed with a reflective surface that focuses incoming sunlight onto a square pipe suspended above each trough.

In an embodiment of the invention, each parabolic trough incorporates a thin layer of stainless steel with a mirror finish to create the reflective surface necessary for concentrating solar energy.

The parabolic shape is specifically engineered to focus incoming sunlight onto the bottom heat absorbing surface, optionally a flat black surface, surface of the square pipe suspended above the trough.

In the preferred embodiment, the parabolic troughs are key inventive components of the design, with their specific configuration enabling efficient solar energy collection. The parabolic troughs are positioned to focus sunlight onto the suspended pipes made of reflective stainless steel, creating a highly efficient heat transfer system.

In an embodiment of the invention, the parabolic troughs are arranged radially around the tower, with their 45-degree orientation optimizing solar collection based on the installation latitude. The troughs' elevation of approximately 30 meters above ground level allows for optimal positioning relative to both the incoming solar radiation and the tower's intake system.

In the preferred embodiment, the parabolic trough design enables significantly more efficient heating compared to traditional glass canopy systems. While conventional designs achieve temperature differentials of approximately 25 degrees Celsius, the parabolic trough configuration can heat the air within the pipes to approximately 500 degrees, demonstrating substantially improved heating efficiency.

In an embodiment of the invention, the parabolic trough design significantly reduces the required installation area compared to conventional glass canopy systems. While traditional designs require approximately 7,000 meters in diameter of glass arranged in a circle, the present embodiment achieves superior heating efficiency with a total combined diameter of only approximately 300 meters.

In the preferred embodiment, the enhanced efficiency is achieved through the concentrated focusing effect of the parabolic troughs. Each trough focuses incoming sunlight onto a single point on the suspended pipe, creating a much more intense heating effect than the dispersed heating provided by traditional glass canopies. This concentrated solar energy enables the system to heat air within the pipes to approximately 500 degrees, compared to the relatively modest temperature increases achieved by conventional designs.

In an embodiment of the invention, the superior heating efficiency of the parabolic trough system translates directly to reduced infrastructure requirements. While conventional systems require extensive glass canopy installations spanning 7 kilometers in diameter to generate sufficient heat for updraft creation, the present embodiment achieves greater heating capacity with approximately 900 troughs arranged around a 100-meter diameter tower.

In the preferred embodiment, the efficiency gains are further enhanced by the system's ability to create temperature differentials of 100 degrees Celsius between ambient air and heated air, compared to only 25 degrees in conventional designs. This increased temperature differential is achieved while requiring only a fraction of the installation area, substantially reducing construction costs compared to traditional glass canopy systems.

In accordance with the preferred embodiment, the system functions in accordance with the following method of operation:

Collecting Solar Energy: The operation begins with an array of 1-900 parabolic troughs arranged radially around the central 1000-meter tower. Each trough incorporates a thin layer of stainless steel with a mirror finish and measures 1 meter in width by 60 meters in length. The troughs are positioned approximately 30 meters above ground level and oriented at 45 degrees to be perpendicular to incoming solar radiation for optimal collection efficiency.

Focusing Solar Radiation: The parabolic shape of each trough concentrates incoming sunlight onto suspended square pipes positioned above. The troughs' heat absorbing surface focuses the solar energy onto the inferior aspect of the 45-centimeter square pipes, which are constructed of dark or black finished stainless steel treated to maximize heat absorption and transfer.

Heating Internal Air: The concentrated solar energy from the parabolic troughs heats the air contained within the suspended square pipes. Through this focused heating process, the air temperature within the pipes can reach up to 500 degrees, significantly higher than conventional solar updraft tower designs which typically achieve much lower temperature differentials.

Transferring Heated Air: The heated air moves through the delivery pipe system from the exterior collection area to release points within the tower interior. The pipes, positioned approximately 30 meters high externally, connect to release points 10-20 meters above the turbine level inside the tower, creating a continuous flow of superheated air.

Drawing Ambient Air: The tower's base design incorporates open arches positioned 5-10 meters above ground level. These arches allow ambient air to be drawn into the tower through natural convection, creating an intake zone where external air freely flows into the tower structure.

Mixing Air Flows: The system combines the heated air from the delivery pipes with ambient air entering through the base arches. This mixing process creates a temperature differential of approximately 100 degrees Celsius between the ambient air and the heated air mass, significantly exceeding the 25-degree differential achieved in conventional designs.

Generating Updraft: The substantial temperature differential within the 1000-meter tall tower creates a powerful natural convection effect. As the heated air mass rises through the tower structure, it generates updraft velocities of up to 50 miles per hour, creating a continuous vertical air movement.

Driving Turbine System: The combined airflow from both heated and ambient sources drives a turbine system positioned at the tower's base. The turbine's strategic location, approximately 5-10 meters above ground level, allows it to capture the maximum energy potential from the mixing air streams. The staged mixing injection process represents a synergistic design solution to a fundamental technical contradiction in high-temperature solar updraft systems: how to introduce high-grade concentrated heat (500° C.) without destroying laminar draft characteristics or exposing turbine components to thermal failure. The strategic placement of heated air release points at 10-20 meters above the turbine system creates a thermal plume ejector pump effect. The 500° C. air functions as an acceleration booster that pulls ambient air through the turbine at higher velocities, capturing kinetic energy from the temperature differential without subjecting mechanical components to extreme thermal stress. In an embodiment, the turbine system comprises two or more turbine blades operating within the interior space, which may be configured to rotate in opposing directions to maximize energy extraction or in the same direction for operational consistency. The turbine blades may incorporate toroidal designs, wherein each blade forms a loop shape to minimize turbulence and optimize airflow efficiency. Additionally, the blade surfaces may feature dimples or ridges similar to golf ball texture, enhancing aerodynamic performance and increasing power generation efficiency.

Maintaining Operation: The system maintains continuous power generation as long as solar heating is available to drive the convection process. The parabolic trough design enables each pipe to collect approximately 40,000 watts of solar energy, ensuring sustained operation during daylight hours.

Converting Energy: The turbine system converts the kinetic energy of the rising air mass into mechanical energy, which is then transformed into electrical power through an attached generator system. This conversion process harnesses the natural convection effect created by the tower's height and temperature differential.

Achieving Enhanced Efficiency: The system's design significantly reduces the required installation area compared to conventional designs, requiring only a 300-meter total combined diameter versus traditional 7,000-meter installations. This reduction in size, combined with the higher temperature differentials achieved, results in more efficient power generation at lower construction costs.

In summary, the preferred embodiment represents a fundamental paradigm shift in solar updraft tower technology, transitioning from the "Low-Intensity Area" approach of traditional massive greenhouse collectors to a "High-Intensity Concentration" methodology utilizing a compact thermal booster architecture. The system centers around a 1000-meter tall tower with a 100-meter diameter, surrounded by an array of 1-900 parabolic troughs arranged radially within a 300-meter total combined diameter. This compact footprint—representing a 94% reduction in land area compared to conventional 7,000-meter diameter greenhouse designs—demonstrates the invention's core innovation: decoupling collection area efficiency from physical land-use requirements through concentrated solar thermal integration.

The preferred embodiment's core advancement lies in its unique solar collection system, which replaces traditional large-scale glass canopies with precisely engineered parabolic troughs. Each trough measures 1 meter in width by 60 meters in length and incorporates a reflective stainless steel surface that concentrates solar energy onto suspended square pipes. This configuration enables the system to achieve air temperatures of up to 500 degrees within the delivery pipes, creating temperature differentials of approximately 100 degrees Celsius-far exceeding the 25-degree differential typical of conventional designs.

The system's efficiency is demonstrated through its significantly reduced footprint, requiring only a 300-meter diameter installation compared to the 7,000-meter diameter needed for traditional glass canopy systems. Despite this dramatic reduction in size, the preferred embodiment achieves superior heating efficiency through its concentrated solar collection method, with each pipe capable of collecting approximately 40,000 watts of solar energy.

The preferred embodiment of the invention solves critical problems in existing solar updraft tower technology by substantially reducing construction costs while improving power generation efficiency. The elimination of extensive glass canopy structures, combined with the enhanced heating capability of the parabolic trough system, enables more cost-effective electricity production while maintaining the ability to generate updraft velocities of up to 50 miles per hour within the tower structure.

Through this innovative design, the preferred embodiment provides a practical and efficient solution for solar thermal power generation, addressing both the capacity limitations and cost constraints that have historically challenged solar updraft tower technology.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

I claim:

1. A solar updraft tower system comprising: a central tower having a height of 1000 meters and a diameter of 100 meters; a plurality of parabolic troughs arranged radially around a base of the central tower; wherein each parabolic trough of the plurality of parabolic troughs comprises: a width of 1 meter; a length of 60 meters; and an elevation of 30 meters above ground level; a plurality of delivery pipes, wherein each delivery pipe is suspended above a corresponding parabolic trough; wherein each delivery pipe comprises: a square cross-section measuring 45 centimeters on each side; a stainless steel construction with a heat absorption maximizing finish; and wherein the system has a total combined diameter of 300 meters.

2. The system of claim 1, wherein the central tower comprises: a plurality of open arches at its base positioned 5-10 meters above ground level.

3. The system of claim 1, wherein: the plurality of parabolic troughs comprises between 1 and 900 parabolic troughs.

4. The system of claim 1, wherein: each parabolic trough is positioned at 45 degrees to optimize orientation perpendicular to incoming solar radiation.

5. The system of claim 1, further comprising: a turbine system positioned within the central tower 5-10 meters above ground level.

6. The system of claim 5, wherein: the delivery pipes are configured to release heated air within the central tower at a height of 10-20 meters above the turbine system.

7. The system of claim 1, wherein: each delivery pipe is capable of collecting 40,000 watts of solar energy.

8. The system of claim 1, wherein: the system is configured to create a temperature differential of 100 degrees Celsius between ambient air and heated air within the central tower, and the system is configured to generate updraft velocities of up to 50 miles per hour within the central tower.

9. The system of claim 1, wherein: the delivery pipes are configured to achieve internal air operating temperatures of up to 500 degrees Celsius, positioning the system in a high-exergy concentration regime that exceeds conventional solar updraft tower operating temperatures by at least a factor of four.

10. A method of generating electrical power comprising: collecting solar energy using a plurality of parabolic troughs arranged radially around a central tower; focusing the collected solar energy onto delivery pipes suspended above the parabolic troughs; heating air within the delivery pipes to a temperature of up to 500 degrees; transferring the heated air to an interior of the central tower; releasing the heated air at a height of 10-20 meters above a turbine system; drawing ambient air through open arches at a base of the central tower; mixing the heated air with the ambient air to create an updraft within the central tower; and generating electrical power using the turbine system driven by the updraft.

11. The method of claim 10, wherein: the central tower has a height of 1000 meters and a diameter of 100 meters.

12. The method of claim 10, wherein: each parabolic trough has a width of 1 meter and a length of 60 meters.

13. The method of claim 10, wherein: each delivery pipe has a square cross-section measuring 45 centimeters on each side.

14. The method of claim 10, wherein: the method creates a temperature differential of 100 degrees Celsius between the ambient air and the heated air.

15. The method of claim 10, wherein: the method generates updraft velocities of up to 50 miles per hour within the central tower.

16. The system of claim 5, wherein: the turbine system comprises two or more turbine blades configured to operate within the interior space of the central tower.

17. The system of claim 16, wherein: the two or more turbine blades are configured to rotate in opposing directions.

18. The system of claim 16, wherein: the two or more turbine blades are configured to rotate in the same direction.

19. The system of claim 5, wherein: the turbine system comprises toroidal blades, wherein each blade is configured in a loop shape to reduce turbulence.

20. The system of claim 19, wherein: the turbine system comprises a single toroidal blade or multiple toroidal blades.

* * * * *